(12) United States Patent
Khine et al.

(10) Patent No.: US 9,452,564 B2
(45) Date of Patent: Sep. 27, 2016

(54) MULTI-SCALE WRINKLES FOR FUNCTIONAL ALIGNMENT OF STEM CELLS AND CARDIAC DERIVATIVES

(71) Applicant: The Regents of the University of California, Oakland, CA (US)

(72) Inventors: Michelle Khine, Irvine, CA (US);
Ronald A. Li, Sandy Bay (HK);
Cheng-Wei Chen, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 47 days.

(21) Appl. No.: 13/654,275

(22) Filed: Oct. 17, 2012

(65) Prior Publication Data
US 2013/0040335 A1 Feb. 14, 2013

Related U.S. Application Data

(63) Continuation-in-part of application No. 13/367,317, filed on Feb. 6, 2012.

(60) Provisional application No. 61/548,699, filed on Oct. 18, 2011, provisional application No. 61/440,350, filed on Feb. 7, 2011.

(51) Int. Cl.
| *C12N 5/00* | (2006.01) |
| *C12N 5/071* | (2010.01) |
| *B29C 59/14* | (2006.01) |
| *B29C 61/02* | (2006.01) |

(52) U.S. Cl.
CPC ............... *B29C 59/14* (2013.01); *B29C 61/02* (2013.01)

(58) Field of Classification Search
None
See application file for complete search history.

(56) References Cited

U.S. PATENT DOCUMENTS

| 4,247,514 A | 1/1981 | Luise |
| 4,337,279 A | 6/1982 | Polak |
| 4,470,415 A | 9/1984 | Wozniak |
| 4,596,728 A | 6/1986 | Yang et al. |
| 5,079,273 A | 1/1992 | Kuroda et al. |
| 5,418,136 A | 5/1995 | Miller et al. |
| 5,441,803 A | 8/1995 | Meissner |
| 6,376,619 B1 | 4/2002 | Halverson et al. |
| 6,395,483 B1 | 5/2002 | Patil et al. |
| 6,482,638 B1 | 11/2002 | Patil et al. |
| 6,548,607 B2 | 4/2003 | Halverson et al. |
| 6,573,338 B2 | 6/2003 | Halverson et al. |
| 6,593,089 B2 | 7/2003 | Patil et al. |
| 6,664,060 B2 | 12/2003 | Patil et al. |
| 6,783,838 B2 | 8/2004 | Coleman et al. |
| 6,841,258 B2 | 1/2005 | Halverson et al. |
| 6,881,538 B1 | 4/2005 | Haddad et al. |
| 6,913,931 B2 | 7/2005 | Halverson et al. |
| 7,033,667 B2 | 4/2006 | Voss-Kehl et al. |
| 7,189,842 B2 | 3/2007 | Halverson et al. |
| 2002/0146745 A1 | 10/2002 | Natan et al. |
| 2003/0180191 A1 | 9/2003 | Suzuki et al. |
| 2004/0092396 A1 | 5/2004 | Glazer et al. |
| 2005/0083781 A1 | 4/2005 | Caren et al. |
| 2011/0122406 A1 | 5/2011 | Khine et al. |
| 2012/0027807 A1* | 2/2012 | Chien et al. ................... 424/400 |
| 2012/0064627 A1 | 3/2012 | Khine et al. |
| 2012/0107556 A1 | 5/2012 | Zhang et al. |
| 2012/0129208 A1 | 5/2012 | Khine et al. |
| 2012/0129209 A1 | 5/2012 | Khine et al. |
| 2012/0200008 A1 | 8/2012 | Khine et al. |
| 2012/0202702 A1 | 8/2012 | Khine et al. |
| 2013/0101795 A1 | 4/2013 | Khine et al. |

FOREIGN PATENT DOCUMENTS

| WO | WO 2009/064816 A1 | 5/2009 |
| WO | WO 2010/085751 A2 | 7/2010 |
| WO | WO 2010/108025 A2 | 9/2010 |
| WO | WO 2010/132610 A2 | 11/2010 |
| WO | WO 2010/132611 A2 | 11/2010 |
| WO | WO 2010/132612 A2 | 11/2010 |
| WO | WO 2011/028579 A2 | 3/2011 |
| WO | WO 2012/115658 A1 | 8/2012 |
| WO | WO-2013/063406 A1 | 5/2013 |

OTHER PUBLICATIONS

Formstein et al. "Seeding bioreactor-produced embryonic stem cell-derived cardiomyocytes on different porous, degradable, polyurethane scaffolds reveals the effect of scaffold architecture on cell morphology", Tissue Engineering 14(3): 369-378, 2008.*
U.S. Appl. No. 13/367,320, filed Feb. 6, 2012, Michelle Khine.
U.S. Appl. No. 13/367,317, filed Feb. 6, 2012, Michelle Khine.
Au et al., "Cell culture chips for simultaneous application of topographical and electrical cues enhance phenotype of cardiomyocytes", Lab Chip 9: 564-575 (2009).
Au et al., "Interactive effects of surface topography and pulsatile electrical B01eld stimulation on orientation and elongation of B01broblasts and cardiomyocytes", Biomaterials 28: 4277-4293 (2007).
Bettinger et al., "Engineering Substrate Topography at the Micro- and Nanoscale to Control Cell Function," Angew Chem Int Ed Engl 48:54065415 ( 2009).
Bowden et al., "Spontaneous formation of ordered structures in thin films of metals supported on an elastomeric polymer", Nature 393:146-149 (1998).
Chao, et al., "Rapid fabrication of microchannels using microscale plasma activated templating (µPLAT) generated water molds", Lab chip, 7: 641-643, (2007).
Chen et al., "Geometric Control of Cell Life and Death," Science 276: 1425-1428 (1997).
Coyne et al., "A Simple Method for Derivatizing the Surface of Silica Gel with Aldehyde Groups by Employing a New Alkoxy Aldehyde Silane," UCT, Inc. pp. 1-15 (2008).

(Continued)

*Primary Examiner* — Taeyoon Kim
*Assistant Examiner* — Emily Cordas
(74) *Attorney, Agent, or Firm* — Foley & Lardner LLP; Antionette F. Konski; Lydia B. Choi

(57) ABSTRACT

Provided are methods of preparing a biocompatible textured surface on a thermoplastic material comprising treating the material with a plasma and subsequently shrinking the substrate to induce formation of textures. The textured surfaces are useful in one aspect, to align cells such as stem cells.

8 Claims, 7 Drawing Sheets

(56) References Cited

OTHER PUBLICATIONS

Dalby et al., "Nanomechanotransduction and Interphase Nuclear Organization Influence on Genomic Control", J Cell Biochem 102:1234-1244 (2007).
Dalby et al., "Nucleus alignment and cell signaling in fibroblasts: response to a micro-grooved topography", Exp Cell Res 284:274-282 (2003).
Dalby et al., "The control of human mesenchymal cell differentiation using nanoscale symmetry and disorder", Nat Mater 6: 997-1003 (2007).
Efimenko et at, "Development and Testing of Hierarchically Wrinkled Coatings for Marine Antifouling", ACS Appl Mater Interfaces 1(5): 1031-1040 (2009).
Engelmayr et al., "Accordion-like honeycombs for tissue engineering of cardiac anisotropy", Nat Mater 7: 1003-1010 (2008).
Engler et al., "Matrix Elasticity Directs Stem Cell Lineage Specification", Cell 126: 677-689 (2006).
Fu et al., "Tunable Nanowrinkles on Shape Memory Polymer Sheets", Advanced Materials 21:4472-4476 (2009).
Gerecht et al., "The effect of actin disrupting agents on contact guidance of human embryonic stem cells", Biomaterials 28: 4068-4077 (2007).
Jiang et al., "Controlling Mammalian Cell Spreading and Cytoskeletal Arrangement with Conveniently Fabricated Continuous Wavy Features on Poly(dimethylsiloxane)", Langmuir 18: 3273-3280 (2002).
Kim et al., "Nanoscale cues regulate the structure and function of macroscopic cardiac tissue constructs", Proc Natl Acad Sci 107(2): 565-570 (2010).
Laflamme et al., "Cardiomyocytes derived from human embryonic stem cells in pro-survival factors enhance function of infarcted rat hearts", Nat Biotechnol 25(9): 1015-1024 (2007).
Lam et al., "Reversible on-demand cell alignment using reconfigurable microtopography", Biomaterials 29: 1705-1712 (2008).
Luna et al., "Multiscale Biomimetic Topography for the Alignment of Neonatal and Embryonic Stem Cell-Derived Heart Cells", Tissue Engineering (Part C) 17(5): 579-588 (2011).
McNamara et al., "Nanotopographical Control of Stem Cell Differentiation", Journal of Tissue Engineering pp. 1-13 (2010).
Murtuza et al., "Micro- and Nanoscale Control of the Cardiac Stem Cell Niche for Tissue Fabrication", Tissue Eng (Part B) 15(4):443-454 (2009).
Nathan et al., "Mechano-topographic modulation of stem cell nuclear shape on nanofibrous scaffolds", Acta Biomaterialia 7: 57-66 (2011).
Pagliari et al., "Cooperation of Biological and Mechanical Signals in Cardiac Progenitor Cell Differentiation", Adv. Mater. 23: 514-518 (2011).
Pajerowski et al., "Physical plasticity of the nucleus in stem cell differentiation", Proc. Natl. Acad. Sci. 104(40): 15619-15624 (2007).
Pins et al., "Self-Assembly of Collagen Fibers. Influence of Fibrillar Alignment and Decorinon Mechanical Properties", Biophysical Journal 73: 2164-2172 (1997).
Soliman et al., "Multiscale three-dimensional scaffolds for soft tissue engineering via multimodal electrospinning", Acta Biomaterialia 6: 1227-1237 (2010).
Stevens et al., "Physiological function and transplantation of scaffold-free and vascularized human cardiac muscle tissue", Proc. Natl. Acad. Sci. 106(39): 16568-16573 (2009).
U.S. Appl. No. 13/367,320 Non-Final Office Action dated Aug. 3, 2012.
U.S. Appl. No. 13/367,320 Final Office Action dated Feb. 22, 2013.
U.S. Appl. No. 13/367,317 Non-Final Office Action dated Jul. 22, 2013.
U.S. Appl. No. 13/367,317 Restriction Requirement dated Apr. 19, 2013.
Van Der Meer et al., "Analyzing shear stress-induced alignment of actin filaments in endothelial cells with a microfluidic assay", Biomicrofluidics 4: 11103(1-5) (2010).
Watt et al., "Cell shape controls terminal differentiation of human epidermal keratinocytes", Proc. Natl. Acad. Sci. 85:5576-5580 (1988).
Xu et al., "Feeder-free growth of undifferentiated human embryonic stem cells", Nat. Biotechnol. 19: 971-974 (2001).
Xue et al., "Functional Integration of Electrically Active Cardiac Derivatives From Genetically Engineered Human Embryonic Stem Cells With Quiescent Recipient Ventricular Cardiomyocytes: Insights Into the Development of Cell-Based Pacemakers", Circulation 111:11-20 (2005).
Yang et al., "Human cardiovascular progenitor cells develop from a KDR1 embryonic-stem-cell-derived population", Nature 453: 524-529 (2008).
Yim et al., "Nanotopography-induced changes in focal adhesions, cytoskeletal organization, and mechanical properties of human mesenchymal stem cells", Biomaterials 31: 1299-1306 (2010).
U.S. Appl. No. 61/177,402, filed May 12, 2009, Khine et al.
U.S. Appl. No. 61/646,177, filed May 11, 2012, Khine et al.
U.S. Appl. No. 61/755,871, filed Jan. 23, 2013, Ronald et al.
Junkar et al., "Influence of oxygen and nitrogen plasma treatment on polyethylene terephthalate (PET) polymers," Vacuum, 84:83-85 (2009).
Mandon et al., "Polyshrink (TM) based microfluidic chips and protein microarrays", Biosensors and Bioelectronics 26: 1218-1224 (2010).
McBeath et al., "Cell Shape, Cytoskeletal Tension, and RhoA Regulate Stem Cell Lineage Commitment", Developmental Cell 6: 483-495 (2004).
Nguyen et al., "Better shrinkage than Shrinky-Dinks", Lab Chip 10: 1623-1626 (2010).
Tan et al., "Bionanotechnology based on Silica Nanoparticles", Medicinal Research Reviews, 24(5):621-638 (2004).
Taylor et al., "Shrink film patterning by craft cutter: complete plastic chips with high resolution/high-aspect ratio channel", Lab Chip 10: 2472-2475 (2010).
Tessier et al., "Improved surface sensing of DNA on gas-etched porous silicon", Sensors and Actuators B 120: 220-230 (2006).
Thomson et al., "Embryonic Stem Cell Lines Derived from Human Blastocysts", Science 282: 1145-1147 (1998).
U.S. Appl. No. 13/367,317 Final Office Action dated Jan. 21, 2014.
Volle et al., "Enhanced sensitivity detection of protein immobilization by fluorescent interference on oxidized silicon", Biosensors and Bioelectronics 19: 457-464 (2003).
Zheng et al., "Silica colloidal crystals for enhanced fluorescence detection in microarrays", Anal. Chem. 79:3867-3872 (2007).
U.S. Appl. No. 13/891,104, filed May 9, 2013, Khine et al.
Chen, A. et al. (2011) "Shrink-Film Configurable Multiscale Wrinkles For Functional Alignment Of Human Embryonic Stem Cells and Their Cardiac Derivatives," Advanced Materials, 23:5785-5791.
Notice of Allowance for U.S. Appl. No. 13/367,317, mailed Jul. 2, 2014, 7 pages.
Notice of Allowance for U.S. Appl. No. 13/367,317, mailed Apr. 24, 2014, 9 pages.
Non-Final Office Action for U.S. Appl. No. 13/367,320, mailed Oct. 27, 2014, 14 pages.
Restriction Requirement for U.S. Appl. No. 13/891,104, mailed Jan. 15, 2015, 9 pages.
U.S. Appl. No. 13/481,653, filed May 25, 2012, Khine et al.
Nguyen, D. et al. (2009) "Tunable shrink-induced honeycomb microwell arrays for uniform embryoid bodies," Lab on a Chip (9):3338-3344.
Stevens, M.M. et al. (2005) "Direct patterning of mammalian cells onto porous tissue engineering substrates using agarose stamps," Biomaterials 26:7636-7641.
Yokoo, A. et al. (2007) "Pattern Size Reduction of Nanoprint-Fabricated Structures on Heat-Shrinkable Film," Japanese Journal of Applied Physics 46(9B):6395-6397.
Non-Final Office Action in U.S. Appl. No. 13/367,317, mailed Aug. 14, 2013.

(56) References Cited

OTHER PUBLICATIONS

Non-Final Office Action in U.S. Appl. No. 13/481,653, mailed Jul. 28, 2015.
Non-Final Office Action in U.S. Appl. No. 13/481,653, mailed Dec. 3, 2015.
Final Office Action in U.S. Appl. No. 13/367,320, mailed Jun. 19, 2015.
Non-Final Office Action in U.S. Appl. No. 13/891,104, mailed Apr. 13, 2015.
Final Office Action in U.S. Appl. No. 13/891,104, mailed Dec. 21, 2015.

* cited by examiner

MULTI-SCALE WRINKLES FOR FUNCTIONAL ALIGNMENT OF STEM CELLS AND CARDIAC DERIVATIVES

CROSS-REFERENCE TO RELATED APPLICATIONS

This application is a continuation-in-part of U.S. application Ser. No. 13/367,317, filed Feb. 6, 2012, which in turn claims the benefit under 35 U.S.C. §119(e) of U.S. Application Ser. No. 61/440,350, filed Feb. 7, 2011, and also claims the benefit under 35 U.S.C. §119(e) of U.S. Application Ser. No. 61/548,699, filed Oct. 18, 2011, the contents of each of which are hereby incorporated by reference into the present disclosure in their entireties.

FIELD OF THE INVENTION

The invention disclosed herein relates to the field of nano scale cell culture scaffolds and methods of using the scaffolds to align stem cells.

BACKGROUND

Microfabrication techniques were originally developed for the microelectronic industry, researchers have been able to create simple designs such as well-defined and repetitive patterns of grooves, ridges, pits, and waves. Techniques such as photolithography, electron-beam lithography, colloidal lithography, electrospinning, and nanoimprinting are popular methods for fabricating micro and nano topographical features. The need for large capital investments and engineering expertise has prevented the widespread use of these fabrication methods in common biological laboratories.

Studies of cellular responses to topographies ranging from nano- to microscales are of great importance to fundamental cell biology as well as to applications in stem cell biology and tissue engineering. (Chen, C. S. et al. (1997) Science 276:1425; Dalby, M. J. et al. (2007) Nat. Mater. 6:997; Kim, E. A. et al. (2010) Proc. Natl. Acad. Sci. USA 107:565) Leveraging traditional fabrication techniques originally developed for the semiconductor industry, researchers have been able to precisely control the topographical features of in vitro substrata to better understand the interaction between cells and their microenvironments. Previous studies have demonstrated the phenomenon of contact guidance, directed alignment and migration along lines of topographic anisotropy, using a variety of cells—from myocytes to adult stem cells—with a range of responses. (Kim, E. A. et al. (2010) Proc. Natl. Acad. Sci. USA 107:565; Dalby, M. J. et al. (2003) Exp. Cell Res. 284:274; Nathan, A. S. et al. (2010) Acta Biomater. 7:57; Watt, F. M. et al. (1988) Proc. Natl. Acad. Sci. 85:5576) For example, the effects of contact guidance have been shown to induce cytoskeletal rearrangement, nuclear deformation, and gene expression changes in fibroblasts. (Dalby, M. J. et al. (2003) Exp. Cell Res. 284:274) In addition, stem cell fate can be solely determined by the mechanical cues of their microenvironment in the absence of soluble factors. (Watt, F. M. et al. (1988) Proc. Natl. Acad. Sci. 85:5576; Engler, A. J. et al. (2006) Cell 126:677; Murtuza, B. et al. (2009) Tissue Eng. Part B Rev. 15:443; Pagliari, S. et al. (2011) Adv. Mater. 23:514; Solimon, S. et al. (2010) Acta Biomater. 6:1227) Therefore, the substrates used for such studies need to be biologically relevant and mimic the in vivo microenvironment.

While it has been shown that biophysical cues of various length scales affect cells differently, (Dalby, M. J. et al. (2007) Nat. Mater. 6:997; Kim, E. A. et al. (2010) Proc. Natl. Acad. Sci. USA 107:565; Dalby, M. J. et al. (2003) Exp. Cell Res. 284:274) the majority of currently available fabricated topographies have simple and repetitive patterns of grooves or ridges of either a homogenous size or of a narrow size range at either the microscale, or more recently, the nanoscale. (Chen, C. S. et al. (1997) Science 276:1425; Nathan, A. S. et al. (2010) Acta Biomater. 7:57; Yim, E. K. et al. (2010) Biomaterials 31:1299; Yim, E. K. et al. (2010) Biomaterials 31:1299; Bettinger, C. J. et al. (2009) Angew. Chem. Int. Ed. 48:5406; Bowden, N. (1998) Nature 393: 146; Lam, M. T. et al. (2008) Biomaterials 29:1705; Jiang, X. et al. (2002) Langmuir 18:3273) Although such designs are helpful in studying a controlled cellular behavior, they do not represent the physiological conditions of native tissue necessary for tissue engineering. Nature's ordering is dramatically different from the precisely periodic arrays produced from high precision fabrication approaches. In vivo, the organization of the extracellular matrix (ECM) varies dramatically in its structural arrangement, content, texture, and fiber bundle thickness. For example, collagen, the main structural component in ECM, form self-similar fibrils (20-100 s of nm), which in turn form bundles and fibers across several orders of magnitude. (Pins, G. D. et al. (1997) Biophys. J. 73:2164) While cells in vivo experience topographies with features across a vast size range, physiologically comparable cellular environments with length scales that span several orders of magnitude have not been readily simulated by precision micro- or nanofabrication techniques. Achieving such multiscale features typically relies on substantial capital equipment and/or fabrication expertise (Dalby, M. J. et al. (2007) Nat. Mater. 6:997; Engelmayr, Jr., G. C. et al. (2008) Nat. Mater. 7:1003) limiting their accessibility to biological laboratories.

SUMMARY

It is discovered herein that plasma treatment of a thermoplastic material, such as a polyethylene (PE) film, creates a stiff layer at the surface of a relatively softer bulk PE. Leveraging the inherent retraction properties of the thermoplastic material at elevated temperature, the mismatch in stiffness between two layers will cause the stiff outer layer to buckle and form controllable textures or wrinkles. Accordingly, the present disclosure provides an ultra-rapid, tunable, robust, facile, and inexpensive fabrication method to create multi-scaled self-similar alignment grooves ranging from nano- to micrometers as biomimetic cell culture substrates.

Such methods can create well-controlled multi-scale (nano- to micro-) biomimetic grooves which are effective to induce the alignment of human embryonic stem cells (hESCs) as well as hESC-derived stem cells, e.g., cardiomyocytes (hESC-CM) for improved physiological functionality.

Thus, commodity shrink-wrap film, pre-stressed polyethylene (PE), is briefly oxidized and subsequently shrunk uniaxially to create self-similar aligned grooves or 'wrinkles' over several orders of magnitude ranging from about 5 nm or alternatively from about 10 nm, or alternatively from about 15 nm, or alternatively about 20 nm, or alternatively about 25 nm, or alternatively about 30 nm, or alternatively about 35 nm, or alternatively about 40 nm, or alternatively about 45 nm, or alternatively about 50 nm to about 10 μm. The distribution of wrinkles is controllable, with larger wrinkle sizes becoming more dominant with increased plasma time, in agreement with a theoretical model based on skin thickness. The hierarchical self-assembled bundling of wrinkles mimics the physiological topography of the extracellular matrix.

Using this substrate, the inventors demonstrate for the first time the sub-cellular time-lapse response to topography of feeder-free pluripotent hESCs in the absence of soluble differentiation factors. To the best of the inventors' knowledge, this is the first demonstration of the electrophysiology characterization of an aligned hESC-CM monolayer by measuring action potential (AP) propagation with an optical technique. Because in the native heart tissue, alignment of CMs contributes to anisotropic tissue structure and to coordinated mechanical contraction and electrical propagation, this is a robust biomimetic platform that can offer insight into cardiac stem cell differentiation and function.

Thermoplastic materials, such as PE, are widely used in biomedical applications such as implants and as a supporting material for cell growth. However, untreated thermoplastic material generally have a low surface free energy which is not ideal for cell attachment. Plasma treatment increases surface free energy; hence it promotes cell attachment.

Another benefit of plasma treatment of thermoplastic materials is that the plasma treatment preserves subsurface composition and properties while only affecting the outermost surface layer of the thermoplastic materials.

Therefore, the present disclosure provides an rapid, robust, and inexpensive fabrication method to create multi-scaled textures having groves ranging from micron to nanometer as biomimetic cell culture substrates. The entire process only takes few minutes, and this method alleviates the need for significant capital investment. Moreover, by changing the plasma treatment time and shrinking process, the size of nanotextures and nanowrinkles can be tuned.

Thus, one embodiment of the present disclosure provides a method for preparing a textured surface suitable for biomedical applications, comprising, or alternatively consisting essentially of, or yet further consisting of, shrinking a thermoplastic material, thereby preparing a textured surface on the material, wherein the material has been treated by a plasma. In one aspect, the plasma is oxygen plasma.

The material can be pre-stressed prior to the plasma treatment. When the material is pre-stressed, the shrinking can be achieved by removing the stress. In another aspect, the shrinking is achieved by heating the material, whether the material has been pre-stressed. In a further aspect, the shrinking is performed after plasma treatment.

In some aspects, the shrinking is uniaxial or biaxial. In some aspects, the material is shrunk by at least 60% or more.

Thermoplastic materials suitable for practicing the present technology include, without limitation, a high molecular weight polymer, polyolefin, polyethylene, acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers KYDEX® acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC) or spectralon. In one aspect, the thermoplastic material comprises polyolefin. In another aspect, the thermoplastic material comprises polyethylene.

Also provided is a substrate having a textured surface prepared by a method of any one of above embodiments.

The present disclosure also provides a method for growing and/or differentiating cells comprising placing a cell on a substrate having a textured surface, wherein the textured surface is prepared by a method of any of the above embodiments. In one aspect, the textured surface is treated with an extracellular matrix prior to culturing the cells. In one aspect, the method further comprises removing the cells from the substrate. Still further provided is a population of cells produced by the this method on the substrate or alternatively, removed from the substrate.

Cells that can be aligned on the textured surface, in one aspect, stem cells (e.g., embryonic stem cells, pluripotent cells, iPSCs or embryoid bodies), fibroblasts, muscle cells and stem cell derived cells. In one aspect, the fibroblasts are embryonic fibroblasts. In one aspect, the cells are muscle cells which in turn are aortic smooth muscle cells. In one aspect, the stem cells are human embryonic stem cells (hESCs).

In one aspect, the cells are stem cells or cells derived or differentiated from a stem cell such as a stem cell derived cardiomyocytes. Also provided therefore, is a plurality of derived cells, such as cardiomyocytes, such as in a monolayer, prepared by aligning the cells on a textured surface by culturing an isolated cell that can differentiate into a cardiomyocyte. In one aspect, the cardiomyocytes comprise or have the functionality of possessing an action potential. Such cardiomyocytes can be measured for their action potentials which are useful in characterizing the cardiomyocytes or the stem cells from which they are derived.

Still further provided are a monolayer of cells, such as cardiomyocytes, prepared by any methods described herein on the substrate or alternatively, removed therefrom.

BRIEF DESCRIPTION OF THE FIGURES

FIG. 2a i) shows schematic of wrinkle formation. Two generations of hierarchical wrinkles are demonstrated in the diagram. The black outline represents the stiff outer layer and the color represents the soft bulk polymer. FIG. 2a ii) SEM images with progressive zooms of 1000× and 10 000×, illustrating the self-similar wrinkles for P1, P5, and P15 conditions. The bundling of the wrinkles is apparent. FIG. 2a iii) Feature scale distribution estimated from the Fourier transform of SEM images for the three different plasma conditions. Inset shows the smaller population of wrinkles at 20 000×, not resolvable at the lower SEM magnification. FIG. 2b shows AFM indicates the bundles and the height range of the wrinkles. The AFM image demonstrates the Matrgel® gel matrix coating conform to the topography of the P5 wrinkled substrate. The scan distance of the AFM image is 5×5 μm$^2$. The table summarizes the average and the range wrinkle depths for P0, P1, P5 with and without Matrgel® gel matrix coating, and P15.

FIG. 3a shows fluorescent microscopy images of MEFs cultured on control (glass slide), P0, P1, P5, and P15 wrinkled substrates for 24 h. The polar plots reveal orientation distribution of f-actin for cells grown on different substrates. Each plot is an average of 6 replicates and 30 images total. 90° and 270° are the direction of wrinkles Thinner lines indicate standard deviation. FIG. 3B shows subcellular hESC alignment as indicated by time lapse f-actin and nuclei alignment over 72 h (bar graph, mean±standard deviation (s.d.), n=9 images per time point). Control, C, represents cells grown on glass coverslip, and it is an average of all controls from all time points (n=81 images). FIG. 3c shows nuclear deformation as indicated by nuclear area (left axis of graph, solid line) and circularity (right axis of graph, dash line) as compared to other cell types including AoSMCs and MEFs. Bar graph represents mean±s.d., n=9 images (>300 nuclei) per time point, and * p<0.001 and * * p<0.01. For (b) and (c), red is f-actin (rhodamine) and blue denotes nuclei (DAPI).

FIG. 6a is flow cytometry data of TRA-1-81 on culture day 3 and 6. Red is the unstained control. Green is the cells grown on flat surface, and blue is the cells grown on the wrinkled substrate. FIG. 6b is forward and side scatter data. P1 gate represents the region where hESCs are healthy and suspended as single cells. P2 gate represents the region of likely unhealthy cells as indicated by the high side scattering data. Each condition represents more than 30,000 cells.

DETAILED DESCRIPTION OF THE DISCLOSURE

Definitions

Figure 1:
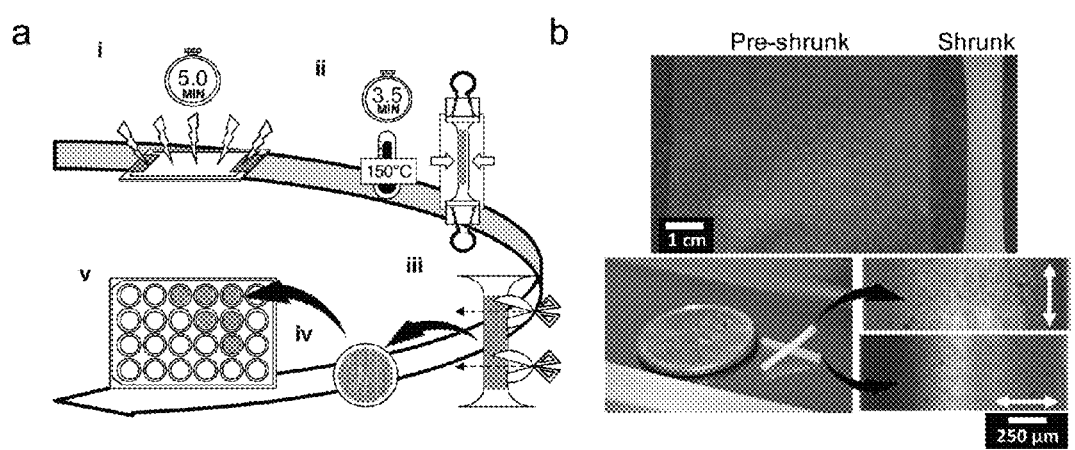
FIG. 1 illustrates the formation of the shrink-film wrinkles (a) Process flow of shrink-film wrinkle formation. (i) PE film is treated with oxygen plasma for 5 minutes (P5). (ii) PE film is constrained on opposite sides and thermally shrunk to create unidirectional wrinkles (iii) Shrunk PE film is cut into desired dimension and (iv) mounted onto a glass coverslip (v) to be used in cell culture experiment. (b) Pre-shrunk (left) and shrunk (right) films. Upon heating, the PE film will shrink approximately 90% length-wise. Inset shows the P5 condition rolled-up into tubes. The direction of wrinkles can be either parallel or perpendicular to the long-axis of the tube. Bright field micrographs taken from the tubes illustrate the direction of wrinkles Images are taken at 4× magnification.

As used herein, certain terms may have the following defined meanings.

As used in the specification and claims, the singular form "a," "an" and "the" include plural references unless the context clearly dictates otherwise.

As used herein, the term "comprising" is intended to mean that the compositions and methods include the recited elements, but do not exclude others. "Consisting essentially of" when used to define compositions and methods, shall mean excluding other elements of any essential significance to the combination when used for the intended purpose. Thus, a composition consisting essentially of the elements as defined herein would not exclude trace contaminants or inert carriers. "Consisting of" shall mean excluding more than trace elements of other ingredients and substantial method steps for preparing the intended device. Embodiments defined by each of these transition terms are within the scope of this invention.

All numerical designations, e.g., pH, temperature, time, concentration, and molecular weight, including ranges, are approximations which are varied (+) or (−) by increments of 0.1. It is to be understood, although not always explicitly stated that all numerical designations are preceded by the term "about". It also is to be understood, although not always explicitly stated, that the reagents described herein are merely exemplary and that equivalents of such are known in the art.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

A "thermoplastic material" is intended to mean a plastic material which shrinks upon heating or upon release of pre-stress such as a stress created by stretching. In one aspect, the thermoplastic materials are those which shrink uniformly without distortion. The shrinking can be either bi-axially (isotropic) or uni-axial (anisotropic). Suitable thermoplastic materials for inclusion in the methods of this invention include, for example, polyolefin, polyethylene, high molecular weight polymers such as acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers KYDEX® acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC) and spectralon.

In some aspects, the thermoplastic material encompasses polyolefin. A polyolefin is a polymer produced from a simple olefin (also called an alkene) as a monomer. For example, polyethylene is the polyolefin produced by polymerizing the olefin ethylene. Polypropylene is another common polyolefin which is made from the olefin propylene.

In some aspects, the thermoplastic material encompasses shape memory polymers (SMPs). SMPs are polymeric smart materials that have the ability to return from a deformed state (temporary shape) to their original (permanent) shape induced by an external stimulus (trigger), such as temperature change.

Commercially available thermoplastic materials include, without limitation, "Shrink-Dink®" shrinkable sheets and porous films such as Solupore® films. Shrink-Dink® shrinkable sheet is a commercial thermoplastic which is used a children's toy. Solupore® film is available from Lydall®, Inc. of Manchester, A clone is a line of cells that is genetically identical to the originating cell; in this case, a stem cell. "Clonal proliferation" refers to the growth of a population of cells by the continuous division of single cells into two identical daughter cells and/or population of identical cells.

The term "propagate" means to grow or alter the phenotype of a cell or population of cells. The term "growing" refers to the proliferation of cells in the presence of supporting media, nutrients, growth factors, support cells, or any chemical or biological compound necessary for obtaining the desired number of cells or cell type. In one embodiment, the growing of cells results in the regeneration of an embryoid body. In some aspects "growing" also infers differentiation of a pluripotent or stem cell into a cell of a defined lineage.

The term "culturing" refers to the in vitro propagation of cells or organisms on or in media of various kinds. It is understood that the descendants of a cell grown in culture may not be completely identical (i.e., morphologically, genetically, or phenotypically) to the parent cell. By "expanded" is meant any proliferation or division of cells.

As used herein, the "lineage" of a cell defines the heredity of the cell, i.e. its predecessors and progeny. The lineage of a cell places the cell within a hereditary scheme of development and differentiation.

A derivative of a cell or population of cells is a daughter cell of the isolated cell or population of cells. Derivatives include the expanded clonal cells or differentiated cells cultured and propagated from an isolated stem cell or population of stem cells. Derivatives also include already derived stem cells or population of stem cells, such as, embryoid bodies from an embryonic stem cell.

"Differentiation" describes the process whereby an unspecialized cell acquires the features of a specialized cell such as a heart, liver, or muscle cell. "Directed differentiation" refers to the manipulation of stem cell culture conditions to induce differentiation into a particular cell type. "Dedifferentiated" defines a cell that reverts to a less committed position within the lineage of a cell. As used herein, the term "differentiates or differentiated" defines a cell that takes on a more committed ("differentiated") position within the lineage of a cell. As used herein, "a cell that differentiates into a mesodermal (or ectodermal or endodermal) lineage" defines a cell that becomes committed to a specific mesodermal, ectodermal or endodermal lineage, respectively. Examples of cells that differentiate into a mesodermal lineage or give rise to specific mesodermal cells include, but are not limited to, cells that are adipogenic, leiomyogenic, chondrogenic, cardiogenic, dermatogenic, hematopoetic, hemangiogenic, myogenic, nephrogenic, urogenitogenic, osteogenic, pericardiogenic, or stromal.

Examples of cells that differentiate into ectodermal lineage include, but are not limited to epidermal cells, neurogenic cells, and neurogliagenic cells.

Examples of cells that differentiate into endodermal lineage include, but are not limited to pleurogenic cells, and hepatogenic cells, cell that give rise to the lining of the intestine, and cells that give rise to pancreogenic and splanchogenic cells.

In another aspect, a stem cell includes a "pluripotent cell" that in turn includes a Induced Pluripotent Stem Cell (iPSC) which is an artificially derived stem cell from a non-pluripotent cell, typically an adult somatic cell, produced by inducing expression of one or more stem cell specific genes. Such stem cell specific genes include, but are not limited to, the family of octamer transcription factors, i.e. Oct-3/4; the family of Sox genes, i.e. Sox1, Sox2, Sox3, Sox 15 and Sox 18; the family of Klf genes, i.e. Klf1, Klf2, Klf4 and Klf5; the family of Myc genes, i.e. c-myc and L-myc; the family of Nanog genes, i.e. OCT4, NANOG and REX1; or LIN28. Examples of iPSCs are described in Takahashi K. et al. (2007) Cell advance online publication 20 Nov. 2007; Takahashi K. & Yamanaka S. (2006) Cell 126: 663-76; Okita K. et al. (2007) Nature 448:260-262; Yu, J. et al. (2007) Science advance online publication 20 Nov. 2007; and Nakagawa, M. et al. (2007) Nat. Biotechnol. Advance online publication 30 Nov. 2007. The field has advanced since the initial findings in 2007 and 2008. A current review of the methods of producing iPSC is provided in Robinton & Daley (2012) Nature 481:295-305 (published on line 18 Jan. 2012).

A "multi-lineage stem cell" or "multipotent stem cell" refers to a stem cell that reproduces itself and at least two further differentiated progeny cells from distinct developmental lineages. The lineages can be from the same germ layer (i.e. mesoderm, ectoderm or endoderm), or from different germ layers. An example of two progeny cells with distinct developmental lineages from differentiation of a multilineage stem cell is a myogenic cell and an adipogenic cell (both are of mesodermal origin, yet give rise to different tissues). Another example is a neurogenic cell (of ectodermal origin) and adipogenic cell (of mesodermal origin).

"Embryoid bodies or EBs" are three-dimensional (3-D) aggregates of embryonic stem cells formed during culture that facilitate subsequent differentiation. When grown in suspension culture, ES cells form small aggregates of cells surrounded by an outer layer of visceral endoderm. Upon growth and differentiation, EBs develop into cystic embryoid bodies with fluid-filled cavities and an inner layer of ectoderm-like cells.

"Substantially homogeneous" describes a population of cells in which more than about 50%, or alternatively more than about 60%, or alternatively more than 70%, or alternatively more than 75%, or alternatively more than 80%, or alternatively more than 85%, or alternatively more than 90%, or alternatively, more than 95%, of the cells are of the same or similar phenotype. Phenotype can be determined by a pre-selected cell surface marker or other marker, e.g. myosin or actin or the expression of a gene or protein, e.g. a calcium handling protein, a t-tubule protein or alternatively, a calcium pump protein. In another aspects, the substantially homogenous population have a decreased (e.g., less than about 95%, or alternatively less than about 90%, or alternatively less than about 80%, or alternatively less than about 75%, or alternatively less than about 70%, or alternatively less than about 65%, or alternatively less than about 60%, or alternatively less than about 55%, or alternatively less than about 50%) of the normal level of expression than the wild-type counterpart cell or tissue.

Methods for Preparing the Textured Surfaces

One embodiment of the present disclosure provides a method for preparing a textured surface that is biocompatible, comprising, or alternatively consisting essentially of, or yet further consisting of, shrinking a thermoplastic material, thereby preparing a textured surface on the material, wherein the material has been treated by a plasma before or after the shrinking Examples of thermoplastic materials are disclosed above.

Plasmas can be prepared with methods known in the art and can vary depending on availability of sources. In one embodiment, the plasma is one or more of oxygen plasma, helium plasma, or hydrogen plasma. In a particular embodiment, the plasma is oxygen plasma.

The duration of plasma treatment can vary and depend on the desired scale of the texture and/or the thermoplastic material, for instance. In one aspect, the plasma treatment takes more than about 10 seconds, or alternatively more than about 20 seconds, about 30 seconds, about 1 minute, about 2 minutes, about 3 minutes, about 4 minutes, about 5 minutes, about 7 minutes, about 10 minutes, about 15 minutes, about 20 minutes, about 25 minutes, or about 30 minutes. In another aspect, the plasma treatment takes less than about 60 minutes, or alternatively less than about 45 minutes, about 30 minutes, about 25 minutes, about 20 minutes, about 15 minutes, about 10 minutes, about 7 minutes, about 5 minutes, about 4 minutes, about 3 minutes, about 2 minutes, about 1 minute, about 30 seconds, or about 20 seconds. In another aspect, the plasma treatment is for an interval between about 0.5 minutes up to 30 minutes, or a 0.5 minute interval therebetween (e.g., 1.5 minute, or 2.0 minute, or 2.5 minute). In some aspects, the treatment is carried out in a closed chamber. In some aspects, the treatment is carried out in a handheld corona discharger.

The thermoplastic material can be pre-stressed prior or after to the plasma treatment. In such a case, the shrinking can be achieved by removing the stress. Such a stress can simply be stretching, either uniaxially or biaxially.

Alternatively, the shrinking can be achieved by heating the material. Depending on the material and desired scale of texture, the temperature can vary. In one aspect, the heating is at least about 200° F., or at least about 250° F., or at least about 275° F., or at least about 300° F., or at least about 350° F.

Shrinking of the material can be uniaxial or biaxial. When the material is shrunk uniaxially, the texture may be one dimensional. When the material is shrunk biaxially, the texture may be two dimensional.

In some embodiments, the material is shrunk, uniaxially or biaxially, by at least about 60%, or alternatively at least about 70%, about 75%, about 80%, about 85%, about 90%, about 91%, about 92%, about 93%, about 94%, about 95%, about 96%, about 97%, about 98%, or about 99% from its original size.

The textured nano-surface have substantially aligned wrinkles or grooves having an average trough depth (major wrinkle) of from about 1 nm to about 2000 nm, or alternatively from about 1 nm to about 800 nm, or alternatively from about 1 nm to about 1750 nm, or alternatively about 1 nm to about 1500 nm, or alternatively about 1 nm to about 1200 nm, or alternatively about 1 nm to about 1250 nm, each measured with out without an ECM coating.

In one aspect, the surface is treated with an extracellular matrix (ECM) prior to culturing and differentiating the cells. Several ECMs are known in the art, e.g., Matrgel® gel matrix is the trade name for a gelatinous protein mixture secreted by Engelbreth-Holm-Swarm (EHS) mouse sarcoma cells and marketed by BD® Biosciences and by Trevigen® Inc under the name Cultrex® BME. This mixture resembles the complex extracellular environment found in many tissues and is used by cell biologists as a substrate for cell culture. A common laboratory procedure is to dispense small volumes of chilled (4° C.) Matrgel® gel matrix onto plastic tissue culture labware. When incubated at 37° C. (body temperature) the Matrgel® gel matrix proteins self-assemble producing a thin film that covers the surface of the labware. An alternative is supplied by AMSBIO under the tradename PathClear® grade basement membrane extract. Sigma-Aldrich® also supplies an ECM gel.

Devices and Methods

The methods disclosed herein are capable of fabricating various devices to be used in applications such as biomedical applications as exemplified herein, molecular detection, optical devices, filters and sorters, high-surface area conductors and actuators, molecular detection, optical devices, filters and sorters, high-surface area conductors and actuators, metrology, surface-enhanced Raman scattering (SERS), metal-enhanced fluorescence (MEF), and extraordinary light transmission. Exploitation of these and other plasmon-induced effects have benefited numerous applications, including near-field optical microscopy, sub-wavelength photonics, biochemical sensing and solar energy harvesting.

One non-limiting example of such applications is cell culture. Use of textured surfaces, including those prepared by shrinking a pre-stressed surface, is known in the art, see, for example, WO/2010/085751 and WO/2010/108025, the contents of which are incorporated into the present disclosure by reference in their entirety.

Texture surfaces prepared by the methods of the present disclosure can also be used as mold for creating hydrophobicity in polymers resultant from the molded high surface area structures being embossed or otherwise applied to the polymer. As nano-scaled textured surfaces are useful in biosensing (see, e.g., WO/2010/132610, the content of which is incorporated into the present disclosure by reference in its entirety), it is further contemplated that devices or textured surfaces prepared by the methods of the present disclosure are used to enhance sensing of biological molecules or samples.

Thus, this disclosure also provides a device having a textured surface prepared by a method of the present disclosure and a method of using such surfaces as described above.

Aligning Stem Cells or Cardiomyocytes and Aligned Cells

The textured surfaces prepared by the present technology can be used to align cells, in particular stem cell or cells differentiated from an embryoid body. In one aspect, the cells are stem cells or stem cell derived cardiomyocytes. Also provided, therefore, are a plurality of cardiomyocytes, such as a monolayer, prepared by aligning the cells on a textured surface. In one aspect, the plurality of cells are substantially homogenous. In one aspect, the cardiomyocytes comprise an action potential or alternatively exhibit an anisotropic ratio (LCV/TCV) of from about 1.65 to about 2.25, or alternatively from about 1.5 to about 2.5, or alternatively from about 1.6 to about 2.4, or alternatively from about 1.7 to about 2.3, or alternatively from about 1.8 to about 2.3, or alternatively from about 1.9 to about 2.2, or alternatively from about 1.72 to about 2.12, or alternatively about 1.85 to about 2.10, or alternatively about 1.88 to about 2.00, or alternatively about 1.92±0.20 (vs. 1.00±0.05 of P0). Such cardiomyocytes can be measured for their action potentials which are useful in characterizing the cardiomyocytes or the stem cells from which they are derived. Although cardiomyocytes are exemplified herein, the techniques and methods are applicable to any cell type as discussed herein.

Still further provided are a monolayer of cells, e.g., fibroblasts, muscle cells, stem cells or cardiomyocytes, prepared by any methods described herein.

Kits

This disclosure also provides a kit to culture aligned cells on a nano-textured surface, comprising a thermoplastic material, associated material such as plasma, cell culture media and instructions for making the nano-textured surface and culturing and differentiating cells as provided herein.

EXPERIMENTAL EXAMPLES

Example 1

This example illustrates preparation of a textured surface with the present technology. With reference to FIG. 1a, at step (i) a Poly olefin (PO) film was treated with oxygen plasma for 5 minutes. Subsequently, the treated film was constrained on opposite sides by using binder clips and was heated at 275° F. for 3.5 minutes to induce the formation of wrinkles (ii). Then the wrinkled substrate was trimmed (iii) to a suitable size (iv) and glued onto a glass coverslip (v).

FIG. 1b shows microscopic pictures of the textured surface prepared by the method of the present technology.

Example 2

This example describes a further example of substrate design and fabrication and a method to culture and differentiate stem cells to cardiomyocytes having electrophysiological functionality.

Fabrication of Wrinkled Substrate:

Wrinkled substrates were fabricated from PE films (Cryovac D-film, LD935, Sealed Air Corporation). PE film, cut into a 2.5 in. by 5.5 in. strip, was placed lengthwise onto a glass plate. The film was treated with oxygen plasma (Plasma Prep II, SPI Supplies) for 1, 5, or 15 min (P1, P5 or P15, respectively). After plasma treatment, a PE piece was constrained on opposite sides with binder clips (2 in. binder clips; OfficeMax), and was thermally shrunk at 150° C. for 3 min to generate aligned wrinkles. The PE wrinkled film was trimmed and mounted to a 12 mm glass coverslip (wrinkled substrate) for cellular plating. Wrinkled substrates were sterilized by immersing in 70% ethanol and under UV light for 30 min inside a biosafety cabinet.

Characterization of Wrinkles:

To characterize the wrinkles, the inventors performed SEM and AFM. For the SEM, wrinkled substrates were sputter coated (Polaron SC7620) with 3 nm gold/palladium. SEM images were obtained on each wrinkled substrate with 1000, 5000, 10 000, and 20 000 magnifications, 10 kV beam, and 12 mm working distance (Hitachi S-4700-2 FE-SEM Scanning Electron Microscope). Images were analyzed by fast Fourier transform using a MATLAB (MathWorks Inc., Natick, Mass., USA) code developed in-house. AFM was conducted on a MFP-3D inverted optical microscope (Asylum Research, Santa Barbara, Calif.). The topographic of images of the 1, 5, and 15 min plasma treatment substrates were taken in tapping mode. Silicon tips with a resonant frequency of about 75 kHz and force constant of 3 N m$^{-1}$ were used. The software used for data acquisition and analysis was IGOR Pro 6.0 (Wavemetrics, Portland, Oreg.).

Cell Alignment:

In the AoSMC, MEF, and hESC-CM alignment study, cells were loaded onto wrinkled substrates, coated with Matrgel® gel matrix (1:200 dilution) and placed inside a 24-well plate, at a density of $5×10^4$ cells per well for both AoSMCs and MEFs, and at a density of $5×10^5$ for hESC-CMs. End-point cell staining was performed at 24 h for both AoSMCs and MEFs and at 48 h for hESC-CMs.

The feeder-independent hESC alignment study first required that the wrinkled substrates be coated in Matrgel® gel matrix for a minimum of 24 h. The cell loading density was $5×10^4$ cells per well. Daily exchange of hESC conditioned medium was required for culturing the cells. End-point cell staining was performed at nine time points: 0.5, 1, 1.5, 2, 4, 6, 12, 24, and 72 h. Confocal microscopy images (Laser Scanning Microscopy 710, Zeiss) were taken on all samples from each time point for further image analysis.

For the long term culture experiment, feeder-independent hESCs were cultured on both control and wrinkled substrates, coated with Matrgel® gel matrix and inserted in 6-well culture plates. The cell loading densities were $2.5×10^5$ and $1×10^5$ cells per well for 3 and 6 day culture, respectively. The medium was exchanged daily but no passaging was performed. Each condition had three replicates, and all replicates were pooled and end-point flow cytometry was performed.

Measurement of hESC-CM Electrophysiology:

Optical mapping of AP propagation was performed on hESC-CM monolayer by using MiCam Ultima fluorescence imaging system (SciMedia) with a 1 cm$^2$ field-of-view. The hESC-CMs were cultured on the Matrgel® gel matrix-coated P5 substrate for 3 to 4 days to allow establishment of intercellular electrical connections before the imaging measurements. To visualize AP propagation, the hESC-CM monolayer on P5 substrate was first stained with 10 μM voltage-sensitive dye di-4-ANEPPS (Invitrogen) for 5 min at room temperature in Tyrode's solution (140 mM NaCl, 5 mM KCl, 1 mM MgCl$_2$, 1 mM CaCl$_2$, 10 mM glucose, and 10 mM HEPES at pH 7.4). The dye was excited by a halogen light source filtered by a 515±35 nm bandpass filter and emission was filtered by a 590 nm high-pass filter. The cells were stimulated by a coaxial point stimulation electrode at 1.5 Hz, 8 V, and 20 ms pulse duration. Data were collected at room temperature with a sampling rate of 0.2 kHz and analyzed using BV_Ana software (BrainVision, Japan).

Aortic Smooth Muscle Cell (AoSMC) and Mouse Embryonic Fibroblast (MEF) Culture:

AoSMCs were maintained on tissue culture plates without protein coating. AoSMC medium consisted of SmBM (CC-3181, Lonza) and SmGM-2 (CC-4149, Lonza). Medium was exchanged every 2 to 3 days, and cells were passaged when reached 80 to 90% confluency.

Growth arrested MEFs (inactivated MEFs) (PMEF-CF, Millipore) were maintained on tissue culture plates coated with 0.1% porcine gelatin (G1890, SigmaAldrich). MEF medium consisted of Dulbecco's Modified Eagle Medium (D-MEM) High Glucose (11960-044, Invitrogen) supplemented with 10% fetal bovine serum (FBS) (SH30071.03, Hyclone) and 2 mM Glutamax (35050079, Invitrogen). For hESC conditioned medium, T-175 cm² tissue culture flasks (1012661LC, Fisher Scientific) were coated with 0.1% porcine gelatin and seeded with inactivated MEFs at a density of 5×10⁶ cells per flask in MEF medium. MEFs were allowed to attach overnight prior to exchange with hESC medium which is described below. For feeder-dependent culture, inactivated MEFs were plated onto 6-well culture plates coated with 0.1% porcine gelatin at a density of 2.5×10⁵ cells per well and allowed to attach overnight prior to addition of hESC colonies.

Human Embryonic Stem Cell (hESC) Culture:

Feeder-dependent H9 hESCs were co-cultured with inactivated MEFs on tissue culture plates coated with 0.1% porcine gelatin. Feeder-dependent hESC medium consisted of Knockout Dulbecco's Modified Eagle Medium (10828-018, Invitrogen) supplemented with 20% Knockout Serum Replacer (10828-028, Invitrogen), 100 μM β-mercaptoethanol (M7522, SigmaAldrich), 100 μM non-essential amino acids (11140-050, Invitrogen), 2 mM Glutamax (35050079, Invitrogen), and 4 ng mL$^{-1}$ human recombinant fibroblast growth factor basic (bFGF) (233FB025, R&D Systems). For feeder-independent culture, H9 hESCs were cultured on tissue culture plates coated with Matrigel® (356230, BD Biosciences). Feeder independent hESC medium was composed of hESC conditioned medium with an additional 4 ng mL$^{-1}$ bFGF. For both culture types, medium was exchanged daily, and cells were passaged once they reached 80 to 90% confluence.

Cardiomyocyte Differentiation:

Cardiomyocytes were derived from the HES2 hESC line (Wicell, Madison, Wis.) by a directed differentiation method as previously described [32]. Briefly, undifferentiated hESCs maintained on hESC-qualified Matrigel (BD Biosciences, San Jose, Calif.) in mTeSR1 medium (Stem Cell Technologies, Vancouver, BC) were dissociated with dispase solution. Cell clusters were suspension-cultured in ultra-low-attachment cell culture dishes (Corning, Lowell, Mass.) with differentiation media (StemPro34, 5 ug mL$^{-1}$ ascorbic acid and 2 mM GlutaMAX-I; Invitrogen, Carlsbad, Calif.) supplemented with recombinant cytokines at the following concentrations: days 0-1, BMP4 (1 ng mL$^{-1}$); days 1-4, BMP4 (10 ng mL$^{-1}$), bFGF (5 ng mL$^{-1}$) and activin A (5 ng mL$^{-1}$); days 4-8, DKK1 (150 ng mL-1) and VEGF (10 ng mL-1). Cultures were maintained in a 5% CO2/5% O2/90% N2 environment. All recombinant proteins were purchased from R & D Systems (Minneapolis, Minn.).

Immunostaining:

Cells were first rinsed with 1× phosphate-buffered saline (1×PBS) (70013-032, Invitrogen) and then fixed with 4% paraformaldehyde (158127, SigmaAldrich) for 10 minutes at 37° C. After fixing, cells were rinsed with 1×PBS and permeabilized with 1×PBS and 0.3% Triton® X-100 (T9284, SigmaAldrich) solution for 5 minutes. Cells were rinsed with 1×PBS again and blocked with 1×PBS and 5% bovine serum albumin (BSA) (A7906, SigmaAldrich) for 2 hours at room temperature. F-actin and nuclei were stained by using rhodamine phalloidin (R415, Invitrogen) and 4',6-diamidino-2-phenylindole (DAPI) (D3571, Invitrogen), respectively.

Flow Cytometry Analysis:

Flow cytometry was performed to detect the expression of pluripotent marker for long term cell culture experiment. Briefly, hESCs were harvested and resuspended into single cells in PBS without calcium and magnesium. Next, cells were stained with TRA-1-81 (sc-21706, Santa Cruz Biotechnology) on ice for 1 hour followed by rinsing and resuspend in PBS. Cells were then stained with FITC (sc-2082, Santa Cruz Biotechnology) for 30 minutes on ice and the rinsing process was repeated. Flow cytometry (LSRII, BD) was performed and data was analyzed using FlowJo software (Tree Star, Oregon, USA).

Image Analysis:

Images were processed to quantify the distribution of orientations using custom scripts written in MATLAB. Images of labeled actin were filtered to estimate the image gradient at each pixel location using a Gaussian derivative (sigma=2 pixels). The distribution of orientations was estimated by computing a histogram of gradient orientations where the contribution of each pixel was weighted by the gradient magnitude. This weighting limited the contribution of pixels in low contrast regions of the image where gradient orientation estimate was uncertain. The orientation histogram was computed for n=12 disjoint 300×300 pixel sub-windows in each image and the standard deviation computed across the subwindows. An independent measurement of cell alignment with the wrinkle substrate was computed by detecting DAPI labeled nuclei and estimating the orientation of the major axis of each nucleus. Nuclei were segmented by thresholding followed by morphological processing and watershed segmentation to separate overlapping nuclei. The orientation of each segmented nucleus was estimated by computing the moment matrix of the segment and identifying the major and minor axes. Elongation of the nuclei was computed as the ratio of the lengths of the major and minor axes. Nuclear area and perimeter were also calculated using the same code. Circularity was calculated using the following formula:

$$C = \frac{4\pi A}{P^2}$$

where A and P are the nuclear area and perimeter, respectively. Circularity is a dimensionless number that measures the ratio between the area of sample and the area of a circle with the same perimeter as the sample. An elongated shape will have circularity less than 1. Furthermore, the closer the value to 0 the more extended and narrow the shape is.

Statistics:

All cell alignment experiments were conducted in duplicate and three independent experiments (n=6 substrates). Image analysis was performed on three images per time point per experiment (n=9 images per time point). For nuclear alignment and deformation, at least 300 nuclei were analyzed per time point. All bar graphs were reported as mean±s.d. Lilliefors' test for normality was performed to determine distribution of data. Two-tailed student's t-test with unequal variance was used for calculating statistical significance between treatments (Microsoft Excel, Redmond, Wash.). Significance levels were set at *p<0.001 and **p<0.01.

Experimental Discussion

To address the challenges of the prior art, the inventors introduce an ultrarapid, tunable, robust, facile, and inexpensive fabrication method to create multiscaled self-similar alignment grooves ranging from nano- to micrometers as biomimetic cell culture substrates, Commodity shrink film prestressed polyethylene (PE) (0.5 mil gauge), is oxidized and subsequently shrunk uniaxially to create aligned grooves, or "wrinkles" (FIG. 1a), over relatively large areas of clinically relevant size (1 cm×6 cm), which is difficult to achieve with other approaches such as electron-beam (e-beam) lithography or nanoimprint lithography (FIG. 1b). In contrast, the patterned size is only limited by the size of the plasma chamber and is amenable to large-scale roll-to-roll plasma systems. Instead of depositing nanometric layers of metal by e-beam or sputter coating in order to generate the stiffness mismatch to create wrinkles upon the retraction of the shrink film as previous reported, (Fu, C. C. et al. (2009) Adv. Mater. 21:4472; Luna, J. I. et al. (2011) Tissue Eng. C 17:579) the inventors have now obviated the need for a metal layer altogether. Unlike silicon, polydimethylsiloxane (PDMS), or glass substrates, this thermoplastic substrate can also be easily heat-molded into various nonplanar shapes such as tubes to serve as 3D scaffolds for studying endothelial alignment for blood vessels (FIG. 1b).

Figure 2:
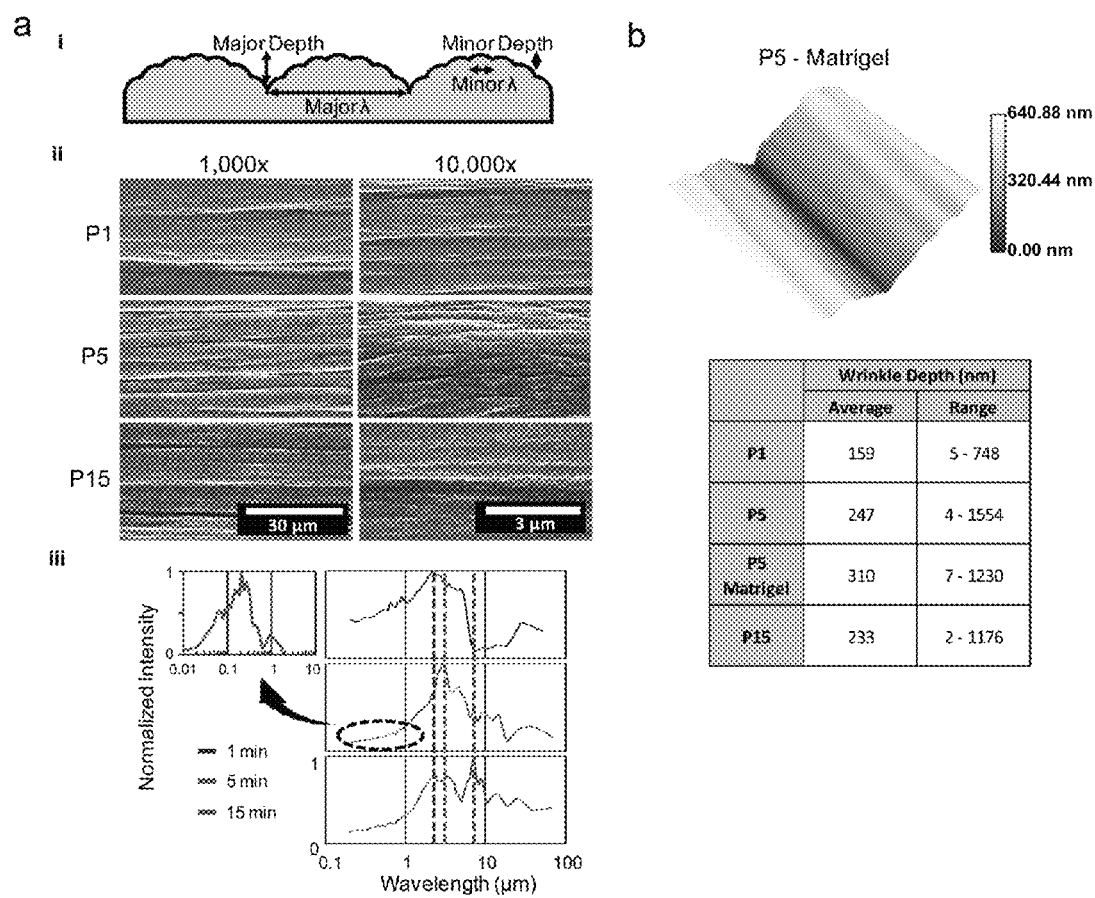
FIGS. 2a and 2b.
Figure 5:
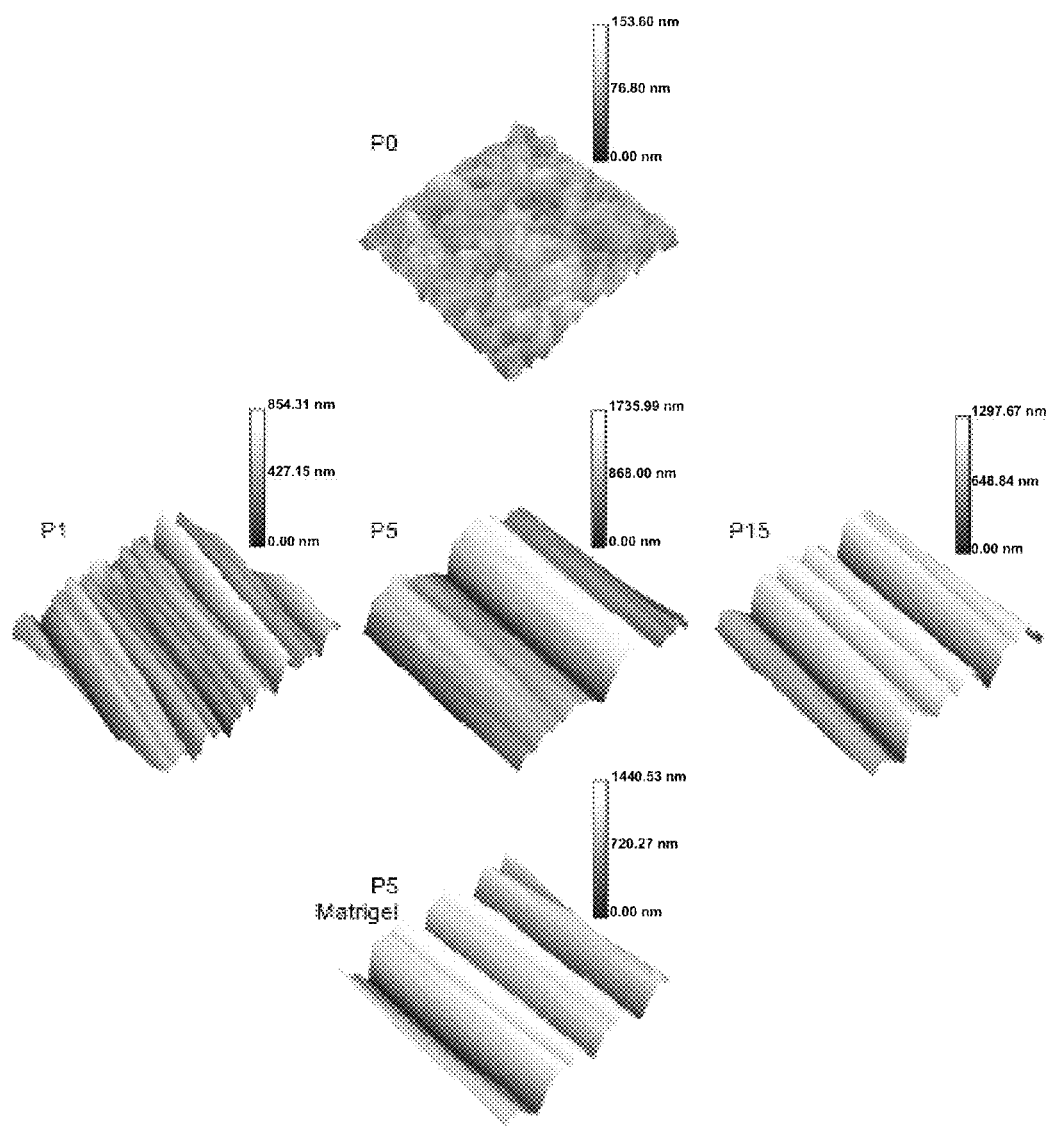
FIG. 5 is an AFM image of P0, P1, P5 (with and without Matrgel® gel matrix coating) and P15 substrates. The scan distance is 30×30 μm.

Oxidation is achieved by oxygen plasma treatment, which creates a thin and relatively stiff layer at the surface of bulk PE film. Leveraging the inherent retraction properties of the prestressed film, which shrinks uniaxially by 90% by heating briefly to 150° C., this mismatch in stiffness causes the stiff outer oxidized layer to buckle and form predictably controllable distributions of nano- and microwrinkles (FIG. 2a). (Fu, C. C. et al. (2009) Adv. Mater. 21:4472) Complete fabrication of the topographical substrate takes less than 10 min. The properties of the aligned wrinkles can be controlled through the plasma treatment time. Interestingly, self-similar wrinkles form across various length scales with bundling of the wrinkles apparent at longer oxidation times. The multiscale hierarchy is revealed through various scanning electron microscopy (SEM) image magnifications. At lower magnification, in which the smaller wrinkles cannot be resolved, the apparent predominant wavelength (major wrinkles) range shifts from 1 to 7 µm as plasma treatment time increases from 1 to 15 min (FIG. 2a). At higher magnification, the apparent predominant wavelengths (minor wrinkles) are 380, 100, and 200 nm with shoulder peaks at 200, 60, and 150 nm for the 1 (P1), 5 (P5), and 15 (P15) min plasma treatment conditions, respectively (P1 and P15 data not shown). The formation of aligned hierarchical grooves is due to different generations of effective layers that are thicker and stiffer than the previous layer. (Efimenko, K. et al. (2009) ACS Appl. Mater. Interfaces 1:1031) Upon shrinking, the first generation of wrinkles and a new effective layer form. Further shrinking induces formation of a new generation of wrinkles until the shrinking process is complete. This process forms multiscale grooves as each successive generation of wrinkles form with wavelengths similar to the hierarchical structuring of collagen bands. (Pins, G. D. et al. (1997) Biophys. J. 73:2164) The data from FIG. 2a reveal that there are at least two generations of P5 wrinkles. As is apparent from the graph, and confirmed by the atomic force microscopy (AFM) measurements (FIG. 5), a nested hierarchy is apparent at the 5 and 15 min plasma times, with distinct size populations. In addition, AFM measurements confirm that the thin layer of Matrigel coating was conformal to the wrinkles and did not obscure substrate topography (FIG. 2b). The distribution of wrinkles is controllable, with larger wrinkle sizes becoming more dominant with increased plasma time, in agreement with the inventors' theoretical model based on skin thickness. (Fu, C. C. et al. (2009) Adv. Mater. 21:4472) At 1 min, the inventors suspect the larger wrinkles and lack of bundling is due to an insufficiently thick and stiff outer layer. The average depths of wrinkles are 159 nm, 247 nm, 310 nm, and 233 nm for P1, P5, P5 with Matrigel coating, and P15, respectively (FIG. 2b). Since the wrinkles are multiscale, the range of depth spans several order of magnitudes.

Figure 3:
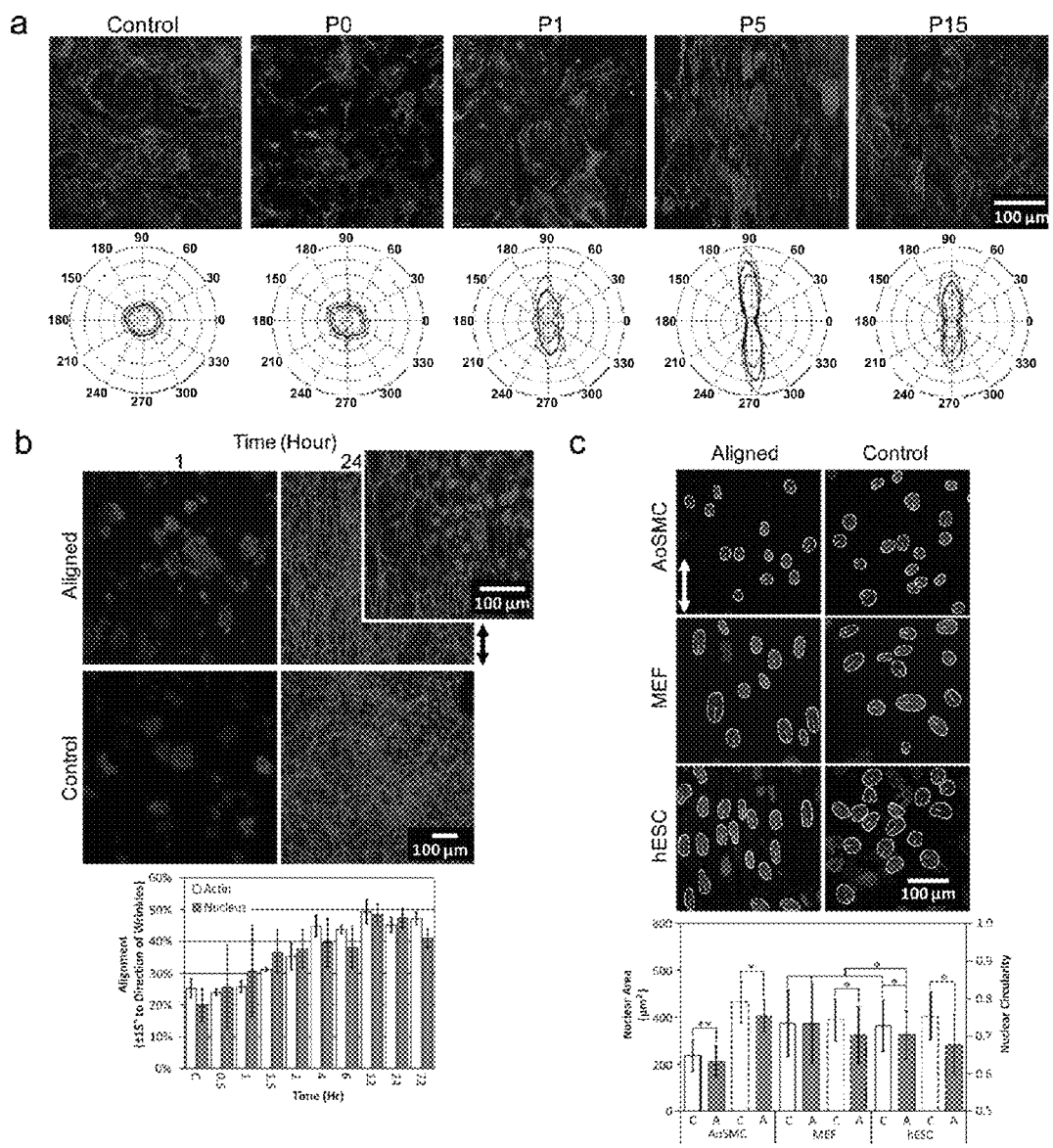
FIGS. 3a to 3c show alignment of various types of cells on the wrinkles

To evaluate the effectiveness of contact guidance using these biomimetic wrinkles, the inventors align mouse embryonic fibroblasts (MEFs), aortic smooth muscle cells (AoSMCs), and human embryonic stem cells (hESCs). The wrinkles can be directly coated with ECM for cell culture or, alternatively, used as a mold for various tissue engineering biodegradable polymers. Growth arrested MEFs are grown on glass coverslip, P0 (no plasma treatment), P1, P5, and P15 substrates for 24 h. Six substrates per condition are included to ensure the consistency of data. F-actin is stained to visualize cytoskeleton of MEFs. MEFs grown on both glass coverslip and P0 exhibit random contact guidance, whereas MEFs grown on the P1, P5, and P15 substrates align within 24 h (FIG. 3a). Moreover, more cells are aligned on the P5 than those grown on the P1 and P15, as indicated by the orientation distribution polar plots. This is likely due to the range of P5 wrinkles (60 nm to 3 µm), which is similar to that of natural ECM fibrils. Therefore, the P5 substrate is chosen for the subsequent AoSMC and hESC alignment experiments.

Figure 6:
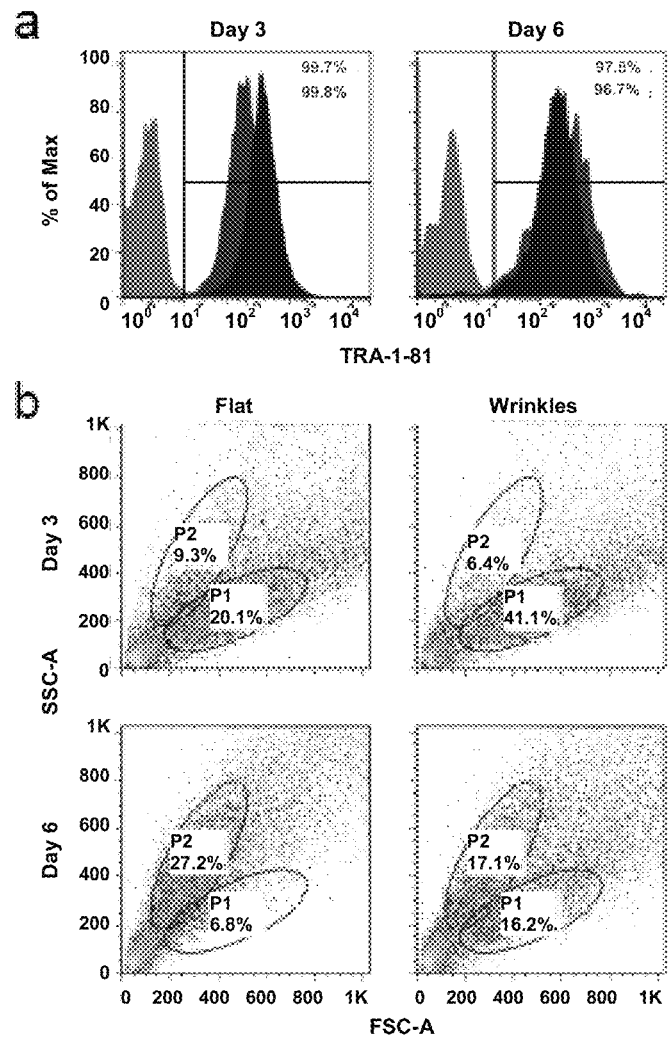
FIGS. 6a and 6b flow cytometry data of hESCs grown on flat and wrinkled substrates for 3 and 6 days. Majority (99.9%) of the hESCs were pluripotent on day 0 by TRA-1-81 (data not shown).

While there has been a report that hESCs align to 600 nm grooves in the presence of differentiation media, (Gerecht, S. et al. (2007) Biomaterials 28:4068) the ability to align and maintain the pluripotent hESCs on the wrinkles without differentiation media over time is important for established differentiation protocols that require an expansion phase of pluripotent hESCs. (Laflamme, M. A. et al. (2007) Nat. Biotechnol. 25:1015; Stevens, K. R. et al. (2009) Proc. Natl. Acad. Sci. USA 106:16568) Despite the mechanical cues sensed by the hESCs, the cells remain relatively pluripotent over time when cultured on the wrinkled substrate under feeder-free pluripotent conditions (FIG. 6). (Xu, C. et al. (2001) Nat. Biotechnol. 19:971) On both days 3 and 6, healthy hESCs suspended as single cells (FIG. 6b, P1 gate) grown on both control and wrinkles express TRA-1-81, a pluripotent surface marker. Notably, forward and side scattering data from flow cytometry indicate that the cells grown on the wrinkled substrate remain healthier than those grown on the controls (FIG. 6b). The increase in side scattering of the same cell type over time typically indicates a less healthy state of cells, which corresponds to an increase in cellular surface granularity and internal complexity. With increasing culture time, more cells shift into the high side scattering region for both controls and wrinkles; however, the percent of cells remaining in P1 is considerably higher for cells grown on wrinkles (17.4%) than those grown on the controls (6.4%).

The inventors demonstrate for the first time the subcellular time-lapse response to topography of feeder-free pluripotent hESCs without soluble differentiation factors. The alignment is assessed based on f-actin and nuclear alignment (FIG. 7b). Time lapse imaging of the cells indicate that the majority of cells align to the wrinkles within the first 4 h of plating, with more than 40% of the cells stably aligning to within 15° of the wrinkle direction. As a point of comparison, to achieve roughly the same degree of alignment by flow with endothelial cells requires 1.5 Pa shear stress for 10 h. (van der Meer, A. D. et al. (2010) Biomicrofluidics 4:11103) The hESC nuclei are also more aligned compared to a study of fibroblast nuclei on 12.5 µm×2 µm microgrooved topography at 24 h culture time (Dalby, M. J. et al. (2003) Exp. Cell Res. 284:274).

Notably, the inventors demonstrate for the first time the deformation of pluripotent hESC nuclei due to topography. The deformed nuclei of hESCs exhibit a decreased surface area, in agreement with topography-induced direct mechanotransduction. (Dalby, M. J. et al. (2007) J. Cell Biochem. 102:1234) The nuclei of undifferentiated stem cells are more mechanically plastic than those of differentiated cells and change as a function of differentiation. (Nathan, A. S. et al. (2010) Acta Biomater. 7:57; Pajerowski, J. D. et al. (2007) Proc. Natl. Acad. Sci. USA 104:15619) The inventors reveal the highly compliant nuclei of hESCs through the measurements of nuclear area and circularity as compared to AoSMCs and MEFs (FIG. 7c). The hESCs exhibit both a decreased average projected area, from 365 to 325 μm2, as well as a decreased average circularity index, from 0.75 to 0.65, in response to the alignment (p<0.001); this is in stark contrast to MEF, where nuclei circularity are altered (p<0.001) by the wrinkles but their projected area are not affected. As apparent from the graphs, AoSMC nuclei do deform (p<0.01 for projected area and p<0.001 for circularity), but to a lesser degree compared to the more plastic undifferentiated hESC nuclei.

Figure 7:
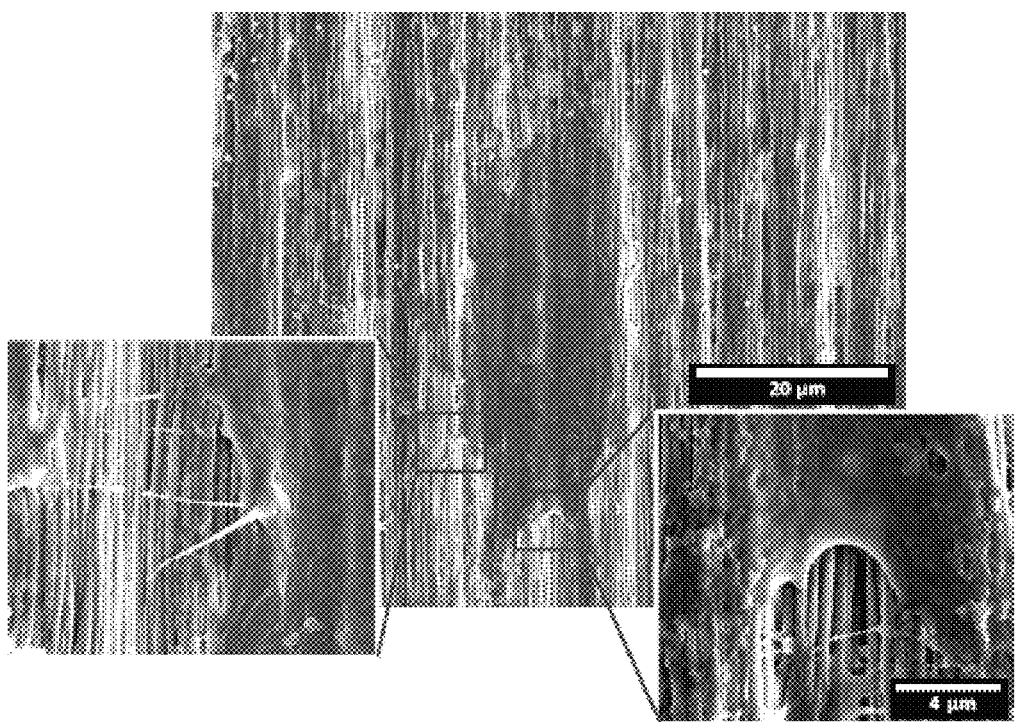
FIG. 7 shows a SEM image of MEFs grown on P5 substrate.

Understanding how the cell perceives topographical cues and translates that information to the nucleus to commence mechanotransductive signaling could enable a strategy of controlled stem cell differentiation without the need for either invasive stimuli or chemical inducement with defined media. (McNamara, L. E. et al. (2010) J. Tissue Eng 2010:1) Importantly, because the multiscale topography inherent to this substrate is easily tuned by plasma treatment time, it is possible to map the effect of local topography on subcellular responses (FIG. 7). This would allow, for example, the role of each length scale in contact guidance to be elucidated. Because comparatively little is yet understood with respect to the effects of hESC alignment on differentiation, it is important and now practical to test the range of physiologically relevant cues in a comprehensive format reflective of the multiscales typical of in vivo substrata.

Figure 4:
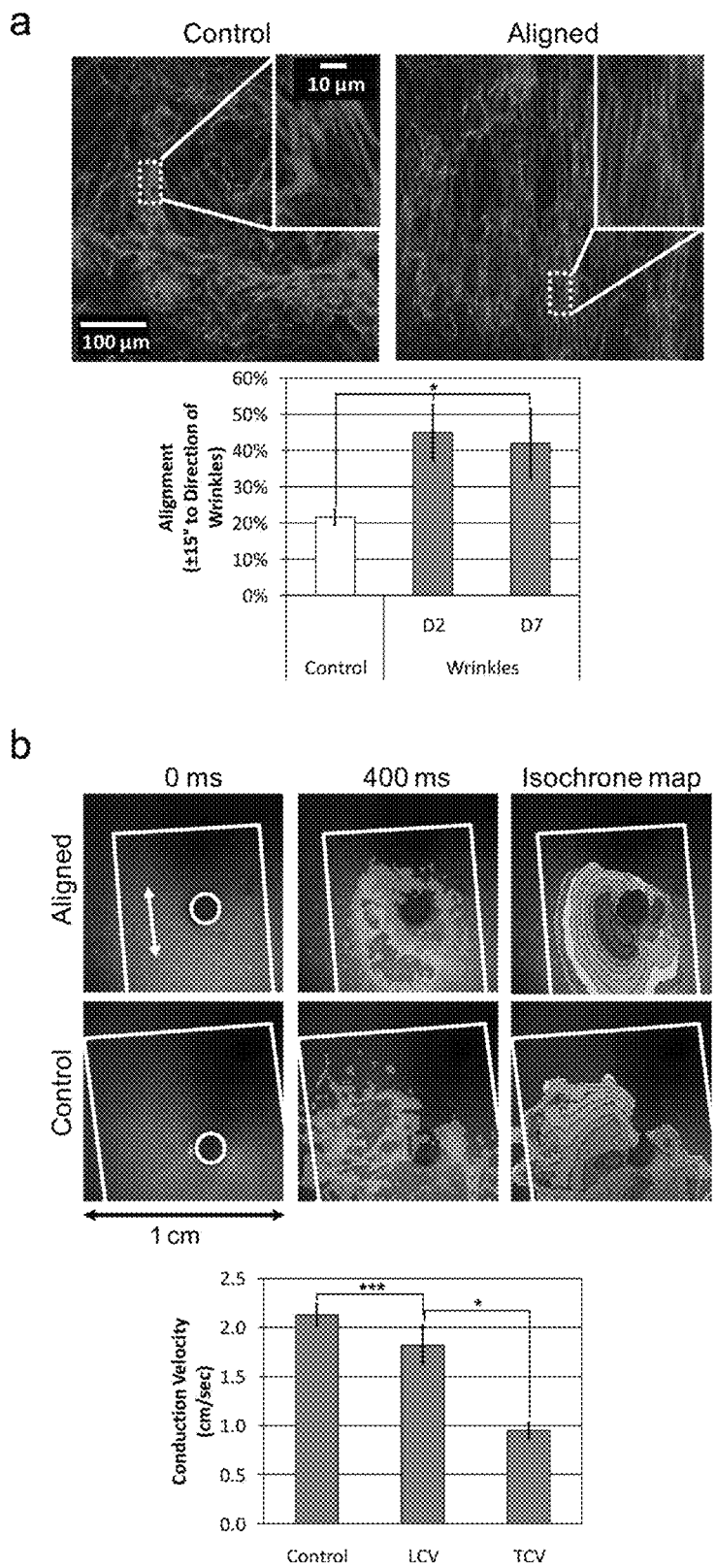
FIG. 4a shows fluorescent microscopy images of hESC-CM cultured on control (P0) and P5 wrinkled substrates for 2 days. Insets represent magnified regions where sarcomeric structures of hESC-CM are compared between conditions. Bar graph (mean±s.d., n=9 images per time point) represents the percentage of cells aligns to ±15° of the direction of wrinkles Control is an average of both day 2 and 7 cultures.
FIG. 4b shows characterization of electrophysiology of hESC-CM monolayers. Point stimulation (1.5 Hz, 8 V, 20 ms duration), as indicated by the white circle, was applied to the monolayers plated on P0 (control) and P5 (aligned) surfaces. The direction of wrinkles is indicated by the double sided arrows, and the substrate is indicated by the white border. AP propagations at 0 ms and 400 ms are shown, and isochrone maps are spaced at 25 ms intervals. The average conduction velocity for the control is 2.13±0.11 cm s-1 (n=3), and the LCV and TCV for the aligned monolayer are 1.82±0.20 cm s-1 and 0.95±0.08 cm s-1 (n=4), respectively. The ratio of LCV to TCV is about 1.91.* p<0.001 and * * * p<0.05.

After successfully aligning a variety of cells, the inventors next test whether physiological functionality improves with alignment. To the best of the inventors' knowledge, the characterization of the electrophysiology of aligned hESC-derived cardiomyocyte (hESCCM) monolayer by measuring action potential (AP) propagation using an optical mapping technique is demonstrated the first time. In the native heart tissue, alignment of cardiomyocytes contributes to the anisotropic tissue structure and facilitates coordinated mechanical contraction and electrical propagation. The alignment of cardiac muscle cells has been studied previously using various microfabrication techniques; (Kim, E. A. et al. (2010) Proc. Natl. Acad. Sci. USA 107:565; Au, H. T. et al. (2007) Biomaterials 28:4277; Au, H. T. et al. (2009) Lab Chip 9:564) however, typical patterned substrates used in the tissue engineering do not exhibit the relevant physiological multiscale topographies. Previously, the inventors demonstrated the alignment of murine neonatal cardiomyocytes (NNCMs) and hESC-CMs on PDMS substrates molded from metallic wrinkles by fluorescent staining of the nuclei, actin, and cardiac troponin. (Luna, J. I. et al. (2011) Tissue Eng. C 17:579) Furthermore, the staining of connexin-43, a gap junction protein, revealed that the aligned NNCMs exhibited a more defined and consistent network than the unpatterned cells suggesting a more natural arrangement of native CMs. This hypothesis is corroborated by the measurement of alignment and AP propagation of hESC-CM monolayer. The alignment of hESC-CM monolayer is determined through f-actin stain, and the sarcomeric striation is revealed with orientation perpendicular to the wrinkles (FIG. 4a). The arrangement of sarcomeric structures is more apparent and organized for the aligned cells than the unpatterned ones. For cells grown on the P0 and P5 substrates, 22±2% and 45±8% of the cells align to ±15° of the wrinkles on day 2, respectively. Furthermore, the alignment of the hESC-CM monolayer remains relatively unchanged until day 7. The aligned hESCCM monolayer also exhibits a more synchronized contraction than the unpatterned one on day 2 (data not shown). AP propagates across the monolayer grown on the control (P0) substrate expands uniformly away from the point of stimulation with an average conduction velocity of 2.13±0.11 cm s-1, which is similar to the value the inventors previous reported (data not shown). [31] In contrast, the aligned monolayer exhibits an anisotropic propagation with faster longitudinal conduction velocity (LCV, 1.82±0.20 cm s-1) parallel to the direction of wrinkles than that of the transverse conduction velocity (TCV, 0.95±0.08 cm s-1) (data not shown), giving rise to an anisotropic ratio (LCV/TCV) of 1.92±0.20 (vs. 1.00±0.05 of P0). The slower LCV is likely related to the morphology of the hESC-CM monolayer, which is a consequence of the size and depth of the wrinkles Previously, Kim et al. demonstrated that the LCV of aligned neonatal rat ventricular myocytes is slower than that of unpatterned cells when the ridge, groove, and depth of the anisotropically nanofabricated substratum (ANFS) are 150, 50, and 200 nm, respectively, (Kim, E. A. et al. (2010) Proc. Natl. Acad. Sci. USA 107:565) and tuning of the dimensions of the ANFS can affect the AP propagation and conduction velocity. Of note, the absolute conduction velocity depends critically on molecular properties such as connexin-encoded gap junction expression; although microgroove-induced directionality may very well affect connexin expression and function, further molecular and cellular investigations will be required. Nonetheless, anisotropy seen in native heart tissue has been clearly reproduced. The difference in AP propagation for the monolayer grown on the control and P5 substrates is more apparent under the isochrone mapping (25 ms intervals). The directed AP propagation and nearly twofold difference between the LCV and TCV suggests the improved functionality of hESC-CMs aligned on the P5 substrate.

The alignment of various cell types including pluripotent hESCs as well as the demonstrated functionality of aligned hESC-CM are some examples of how this substrate can be used to rapidly and easily perform otherwise challenging biological studies. The ability to affect contact guidance of hESCs could elucidate critical molecular pathways and lead to directed differentiation into specific lineages. The aligned patterned substrates enabled the inventors to reproduce the anisotropy seen in the native heart and are therefore a more accurate in vitro model. The preliminary data further show that aligned monolayers of hESC-CMs are less susceptible than unaligned controls to sustained reentry arrhythmias (data not shown). Further studies are warranted and may lead to the design of safer grafts with improved efficacy for future clinical applications. Importantly, such a robust, easy to fabricate and configurable platform (compatible with microtiter plates and spatiotemporal imaging/mapping) could enable ubiquitous alignment of any adherent cell type for various tissue engineering and injury repair applications.

While the present invention is exemplified and illustrated by the use of polystyrene sheets to fabricate channel structures and molds, it would be obvious to those of skill in the art that any thermoplastic receptive material that can be patterned to control the dimensions of the channel defining walls and thereby their size, can be used to fabricate the devices disclosed and claimed herein. In addition, although several other embodiments of the invention are described herein in detail, it will be understood by those skilled in the art that variations may be made thereto without departing from the spirit of the invention or the scope of the appended claims.

REFERENCES

1. C. S. Chen, M. Mrksich, S. Huang, G. M. Whitesides, D. E. Ingber, Science 1997, 276, 1425
2. M. J. Dalby, N. Gadegaard, R. Tare, A. Andar, M. O. Riehle, P. Herzyk, C. D. Wilkinson, R. O. Oreffo, Nat. Mater. 2007, 6, 997.
3. D. H. Kim, E. A. Lipke, P. Kim, R. Cheong, S. Thompson, M. Delannoy, K. Y. Suh, L. Tung, A. Levchenko, Proc. Natl. Acad. Sci. USA 2010, 107, 565.
4. M. J. Dalby, M. O. Riehle, S. J. Yarwood, C. D. Wilkinson, A. S. Curtis, Exp. Cell Res. 2003, 284, 274.
5. A. S, Nathan, B. M. Baker, N. L. Nerurkar, R. L. Mauck, Acta Biomater. 2010, 7, 57.
6. F. M. Watt, P. W. Jordan, C. H. O'Neill, Proc. Natl. Acad. Sci. USA 1988, 85, 5576.
7. A. J. Engler, S. Sen, H. L. Sweeney, D. E. Discher, Cell 2006, 126, 677.
8. B. Murtuza, J. W. Nichol, A. Khademhosseini, Tissue Eng. Part B Rev. 2009, 15, 443.
9. S. Pagliari, A. C. Vilela-Silva, G. Forte, F. Pagliari, C. Mandoli, G. Vozzi, S. Pietronave, M. Prat, S. Licoccia, A. Ahluwalia, E. Traversa, M. Minier, P. Di Nardo, Adv. Mater. 2011, 23, 514.
10. S. Soliman, S. Pagliari, A. Rinaldi, G. Forte, R. Fiaccavento, F. Pagliari, O. Franzese, M. Minieri, P. Di Nardo, S. Licoccia, E. Traversa, Acta Biomater. 2010, 6, 1227.
11. E. K. Yim, E. M. Darling, K. Kulangara, F. Guilak, K. W. Leong, Biomaterials 2010, 31, 1299.
12. C. J. Bettinger, R. Langer, J. T. Borenstein, Angew. Chem. Int. Ed. 2009, 48, 5406.
13. N. Bowden, S. Brittain, A. G. Evans, J. W. Hutchinson, G. M. Whitesides, Nature 1998, 393, 146.
14. M. T. Lam, W. C. Clem, S. Takayama, Biomaterials 2008, 29, 1705.
15. X. Jiang, S. Takayama, X. Qian, E. Ostuni, H. Wu, N. Bowden, P. LeDuc, D. E. Ingber, G. M. Whitesides, Langmuir 2002, 18, 3273.
16. G. D. Pins, D. L. Christiansen, R. Patel, F. H. Silver, Biophys. J. 1997, 73, 2164.
17. G. C. Engelmayr, Jr., M. Cheng, C. J. Bettinger, J. T. Borenstein, R. Langer, L. E. Freed, Nat. Mater. 2008, 7, 1003.
18. C. C. Fu, A. Grimes, M. Long, C. G. L. Ferri, B. D. Rich, S. Ghosh, S. Ghosh, L. P. Lee, A. Gopinathan, M. Khine, Adv. Mater. 2009, 21, 4472.
19. J. I. Luna, J. Ciriza, M. E. Garcia-Ojeda, M. Kong, A. Herren, D. Lieu, R. A. Li, C. C. Fowlkes, M. Khine, K. E. McCloskey, Tissue Eng. C 2011, 17, 579.
20. K. Efimenko, J. Finlay, M. E. Callow, J. A. Callow, J. Genzer, ACS Appl. Mater. Interfaces 2009, 1, 1031.
21. S. Gerecht, C. J. Bettinger, Z. Zhang, J. T. Borenstein, G. Vunjak-Novakovic, R. Langer, Biomaterials 2007, 28, 4068.
22. M. A. Laflamme, K. Y. Chen, A. V. Naumova, V. Muskheli, J. A. Fugate, S. K. Dupras, H. Reinecke, C. Xu, M. Hassanipour, S. Police, C. O'Sullivan, L. Collins, Y. Chen, E. Minami, E. A. Gill, S. Ueno, C. Yuan, J. Gold, C. E. Murry, Nat. Biotechnol. 2007, 25, 1015.
23. K. R. Stevens, K. L. Kreutziger, S. K. Dupras, F. S. Korte, M. Regnier, V. Muskheli, M. B. Nourse, K. Bendixen, H. Reinecke, C. E. Murry, Proc. Natl. Acad. Sci. USA 2009, 106, 16568.
24. C. Xu, M. S. Inokuma, J. Denham, K. Golds, P. Kundu, J. D. Gold, M. K. Carpenter, Nat. Biotechnol. 2001, 19, 971.
25. A. D. van der Meer, A. A. Poot, J. Feijen, I. Vermes, Biomicrofluidics 2010, 4, 11103.
26. M. J. Dalby, N. Gadegaard, P. Herzyk, D. Sutherland, H. Agheli, C. D. Wilkinson, A. S. Curtis, J. Cell Biochem. 2007, 102, 1234.
27. J. D. Pajerowski, K. N. Dahl, F. L. Zhong, P. J. Sammak, D. E. Discher, Proc. Natl. Acad. Sci. USA 2007, 104, 15619.
28. L. E. McNamara, R. J. McMurray, M. J. P. Biggs, F. Kantawong, R. O. C. Oreffo, M. J. Dalby, J. Tissue Eng. 2010, 2010, 1.
29. H. T. Au, I. Cheng, M. F. Chowdhury, M. Radisic, Biomaterials 2007, 28, 4277.
30. H. T. Heidi Au, B. Cui, Z. E. Chu, T. Veres, M. Radisic, Lab Chip 2009, 9, 564.
31. T. Xue, H. C. Cho, F. G. Akar, S. Y. Tsang, S. P. Jones, E. Marban, G. F. Tomaselli, R. A. Li, Circulation 2005, 111, 11.
32. L. Yang, M. H. Soonpaa, E. D. Adler, T. K. Roepke, S. J. Kattman, M. Kennedy, E. Henckaerts, K. Bonham, G. W. Abbott, R. M. Linden, L. J. Field, G. M. Keller, Nature 2008, 453, 524.

What is claimed is:

1. A plurality of cells aligned on nanoscale wrinkles or textures on a surface of a thermoplastic material, wherein the wrinkles or textures are prepared by a method comprising:
   treating a surface of a thermoplastic material with a plasma to increase the stiffness of an outer layer of the surface relative to a subsurface layer,
   constraining two opposite sides of the plasma-treated thermoplastic material, and
   shrinking the constrained plasma-treated thermoplastic material under conditions to buckle the outer layer to form a surface with nanoscale wrinkles or textures relative to the subsurface layer of the material.

2. The plurality of cells of claim 1, wherein the cells are selected from fibroblasts, cardiac cells or cardiomyocytes.

3. The plurality of cells of claim 2, wherein the cells are derived from a plurality of stem cells.

4. The plurality of cells of claim 3, wherein the stem cells are one or more of iPSC, embryonic stem cells, an embryoid body or pluripotent stem cells.

5. The plurality of cells of claim 4, wherein the stem cells are human stem cells.

6. The plurality of cells of claim 1, wherein the plasma-treated nano-textured surface has been treated with plasma for a period from about 0.5 minutes to 30 minutes.

7. The plurality of cells of claim 1, wherein the plasma is one or more of oxygen plasma, helium plasma or hydrogen plasma.

8. The plurality of cells of claim 3, wherein the cells are cardiomyocytes derived from stem cells and wherein the cardiomyocytes exhibit an anisotropic ratio of from about 1.5 to about 2.5 or a measurable action potential.

* * * * *